US005764638A

United States Patent [19]
Ketchum

[11] Patent Number: 5,764,638
[45] Date of Patent: Jun. 9, 1998

[54] METHOD AND APPARATUS FOR FILTERING AND FORWARDING MESSAGES IN A COMPUTER NETWORK USING A LAST SOURCE ADDRESS

[75] Inventor: Kevin D. Ketchum, Folsom, Calif.

[73] Assignee: Level One Communications, Inc., Sacremento, Calif.

[21] Appl. No.: 528,204

[22] Filed: Sep. 14, 1995

[51] Int. Cl.$^6$ ................................................ H04L 12/66
[52] U.S. Cl. .................................................. 370/401
[58] Field of Search ........................... 370/246, 401, 370/402; 340/825.06, 825.07, 825.5, 825.51, 825.52; 380/3, 4, 48, 49, 50

[56] References Cited

U.S. PATENT DOCUMENTS

| | | |
|---|---|---|
| 4,063,220 | 12/1977 | Metcalfe et al. . |
| 4,099,024 | 7/1978 | Boggs et al. . |
| 5,136,582 | 8/1992 | Firoozmand . |
| 5,161,192 | 11/1992 | Carter et al. . |
| 5,177,788 | 1/1993 | Schanning et al. . |
| 5,249,183 | 9/1993 | Wong et al. . |
| 5,265,123 | 11/1993 | Vijeh et al. . |
| 5,345,447 | 9/1994 | Noel . |
| 5,353,353 | 10/1994 | Vijeh et al. ............... 370/445 |
| 5,414,694 | 5/1995 | Crayford et al. ........... 370/246 |
| 5,430,762 | 7/1995 | Vijeh et al. . |

FOREIGN PATENT DOCUMENTS

| | | |
|---|---|---|
| 0 431 751 | 6/1991 | European Pat. Off. . |
| 0 612 170 | 8/1994 | European Pat. Off. . |
| WO 92/17960 | 10/1992 | United Kingdom . |

OTHER PUBLICATIONS

Saunders, Stephen, "No–Frills Hubs: Stack 'Em and Save", Data Communications, vol. 22, No. 17, Nov. 21, 1993, pp. 83,84,86–92.

"LXT901 Universal Ethernet Interface Transceiver" Advance Information Standard, Feb., 1991, Level One Communications, Inc.

"T7202 Smart Hub Controller (SHC)," Preliminary Data Sheet, Sep. 1992, AT&T Microelectronics.

"DP83955/DP83956 LitE End Repeater Interface Controller(LERIC™)" Preliminary, May, 1992, National Semiconductor Corporation.

"DP83950A Repeater Interface Controller (RIC)" Preliminary, Sep., 1991, National Semiconductor Corporation.

*Primary Examiner*—Douglas W. Olms
*Assistant Examiner*—Ajit Patel
*Attorney, Agent, or Firm*—Merchant, Gould, Smith, Edell, Welter & Schmidt, P.A.

[57] ABSTRACT

A system which uses per-port last source address registers, which are part of the repeater function, for making filtering/forwarding decisions, which are part of the bridging function. The system includes a single repeater collision domain divided into segments, one or more transceivers for each segment, a master management device/bridge for the first segment, and one or more slave management devices for the remaining segments. A local signal which allows the forwarding/filtering decision to be distributed is attached to the master management device and all slave management devices. A remote bridge interface is attached to the master management device. A management interface for each management device, either master or slave, is used to attach each management device to its respective transceiver for the ports which controlled by the management device. The master management device/bridge uses a media access control (MAC) function to act as a two-port ethernet bridge, with a repeater collision domain acting as one virtual port and a remote bridge interface acting as the second port.

17 Claims, 5 Drawing Sheets

SINGLE REPEATER COLLISION DOMAIN

OTHER PUBLICATIONS

"International Standard", ISO/IEC 8802-3:1990, ANSI/IEEE Std.802.3-1990 Edition.

"T7201 Multi-Port Repeater Unit (MPR2)" Preliminary Data Sheet, Jun., 1990, AT&T.

"Project 802 Local & Metropolitan Area Networks" Draft Supplement to IEEE Std. 802.3, Type 10BASE-T, P802.31/D11, Jun. 28, 1990.

"ML4653 10BASE-T Transceiver For Multi-Port Repeaters" Advance Information, Sep., 1989, Micro Linear Corporation.

Tugal, Dogan A., and Tugal, Osman, "Chapter 12 Local-Area Networks", *Data Transmission*, 2d ed., McGraw-Hill Book Company, 1989, pp. 389–408.

Shotwell, Robyn E., "The Ethernet Sourcebook.", Elsevier Science Publishing Company, New York, NY, 1985, pp. 281–286.

METHOD AND APPARATUS FOR FILTERING AND FORWARDING MESSAGES IN A COMPUTER NETWORK USING A LAST SOURCE ADDRESS

BACKGROUND OF THE INVENTION

1. Field of the Invention

This invention relates in general to a repeater management apparatus, and in particular, to a method and apparatus that uses the last source address and an electronic signal for filtering and forwarding messages in a computer network.

2. Description of Related Art

Recent advancements in the art of data communications have provided great strides in resource sharing amongst computer systems through the use of networks which offer reliable high-speed data channels. Networks allow versatility by defining a common standard for communication so that information independent of vendor equipment may be exchanged across user applications. As the popularity of networks increase so does the demand for performance. More sophisticated protocols are being established to meet this demand and are utilizing existing twisted pair cables in office buildings so that virtually all computer literate users have access to resources with minimal expense.

The standard for Local and Metropolitan Area Network technologies is governed by IEEE Std. 802. IEEE Std. 802 describes the relationship among the family of 802 standards and their relationship to the ISO Open System Interconnection Basic Reference Model and is herein incorporated by reference. Generally, IEEE Std. 802 prescribes the functional, electrical and mechanical protocols, and the physical and data link layers for Local and Metropolitan Area Networks (LAN/MAN). The specification augments network principles, conforming to the International Standards Organization (ISO) seven-layer model for open systems interconnection (OSI), commonly referred to as "Ethernet". In the hierarchy of the seven-layer model, the lowest layers, the so-called physical and data link layers, comprise functional modules that specify the physical transmission media and the way network nodes interface to it, the mechanics of transmitting information over the media in an error-free manner, and the format the information must take in order to be transmitted.

The lastSourceAddress is an attribute defined in the "Address Tracking" section of the IEEE 802.3 Repeater Management Information Base (MIB) standard, which is herein incorporated by reference. This standard defines attributes which can be used by a management function within an IEEE 802.3 Ethernet Repeater to monitor network behavior. Each instantiation of the lastSourceAddress attribute is permanently associated with an individual IEEE 802.3 physical connection ("port"). The lastSourceAddress attribute saves the value of the Source Address field in the last IEEE 802.3 frame to be received from its associated port.

An Ethernet bridge is a device with two or more physical ports that is capable of forwarding a packet received on any port to any other single port based on the destination address of the packet. A packet that is not forwarded to a port is considered filtered.

A Media Access Control (MAC) function converts digital information, typically stored in memory in the form of a packet, into an actual Ethernet frame which can be transmitted on an Ethernet connection, or a frame received from the network connection which is stored in memory as a packet.

There have been many schemes for providing the bridging functionality between two such users. The most common involves direct passing wherein two Media Access Controllers are tied directly together. The functionality of the direct bridging must be controlled by processes within the Media Access Controllers (MACs) or by an independent CPU. Providing the code to control the bridging increases cost and requires the use of pins other than the data path to communicate status and commands between two MACs.

Certain MAC controllers have implemented an external reject pin which causes the device to filter an incoming packet. The usual function of the reject pin is similar to the function of a "local signal" with respect to a master management device in the present invention, wherein the local signal controls the operation of the MACs. A secondary out of band port is desirable for attachment to a wide area network (WAN), or high speed or backbone local area network (LAN). It is desirable for the repeater management function, which is per-port logic intensive, to be distributed, while allowing the MAC/bridge function to be centralized in one location for easier management.

Therefore, there is a need for multiple user processes in a single computing node to be able to simultaneously share direct access to an I/O device without intervention of the operating system on a per I/O basis.

There is a further need for a repeater management function which is distributed, while the MAC/Bridge function is centralized.

SUMMARY OF THE INVENTION

To overcome the limitations in the prior art described above, and to overcome other limitations that will become apparent upon reading and understanding the present specification, the present invention discloses a system which uses per-port last source address registers, which are part of the repeater function, for making filtering/forwarding decisions, which are part of the bridging function.

The present invention solves the above-described problems by providing a system consisting of a single repeater collision domain divided into segments, one or more transceivers for each segment, a master management device/bridge for the first segment, and one or more slave management devices for the remaining segments. A local signal which allows the forwarding/filtering decision to be distributed is attached to the master management device and all slave management devices. A remote bridge interface is attached to the master management device. A management interface for each management device, either master or slave, is used to attach each management device to its respective transceiver for the ports which controlled by the management device. The master management device/bridge uses a media access control (MAC) function to act as a two-port ethernet bridge, with a repeater collision domain acting as one virtual port and a remote bridge interface acting as the second port.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
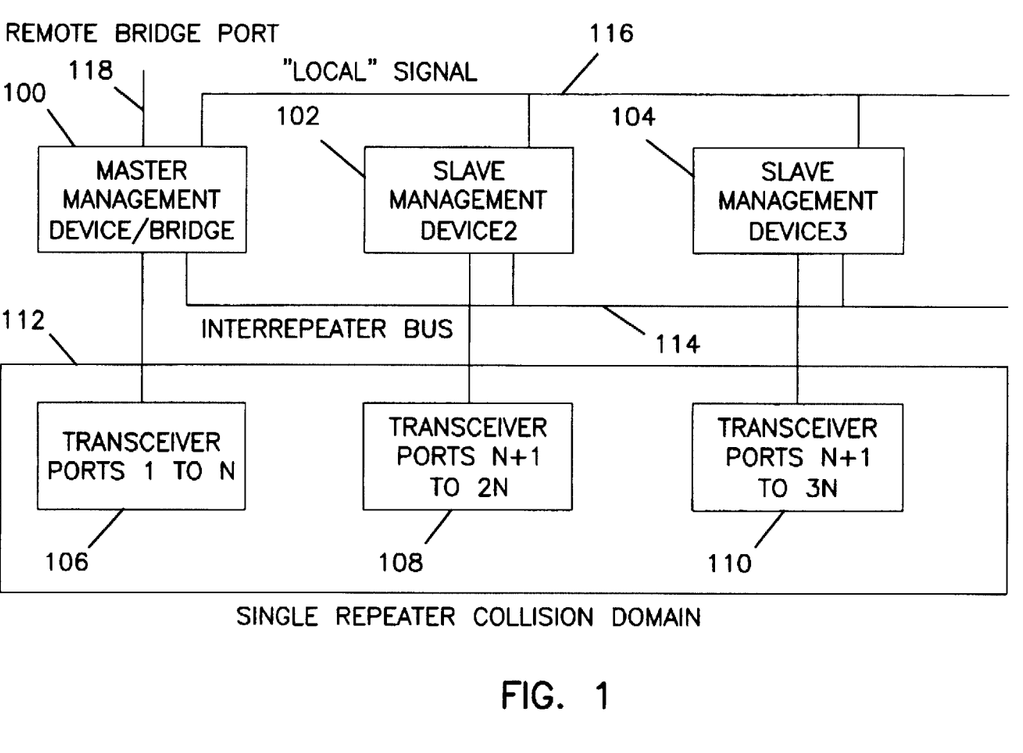
FIG. 1 is a system diagram illustrating the bus packet transfer system between a sender and a receiver.

The present invention provides a two-port ethernet bridge utilizing semaphoring techniques for communicating between two media access control devices. The preferred embodiment of the present invention includes system components as shown in FIG. 1. A single repeater collision domain 112 contains up to 1024 ports divided into segments of N ports each, but it will be recognized that the number of ports used with the present invention may be increased or decreased without loss of generality. A transceiver or set of transceivers 106, 108, 110, are utilized for each segment of N ports. The transceivers 106, 108, 110 typically repeat any packet coming into any port onto the inter repeater bus (IRB) 114. The first segment is controlled by a master management device/bridge 100, and the remaining segments are controlled by slave management devices 102, 104, which are cascaded as needed. It will be recognized that the number of slave management devices may be increased or decreased according to the number of ports and segments without loss of generality. A local signal connection 116 is attached to the master management device 100 and all slave management devices 102, 104. The local signal connection 116 enables the management devices 100, 102, 104 to signal each other directly without using the IRB 114. A remote bridge interface port 118 is attached to the master management device 100.

Each master or slave management device 100, 102, 104 maintains a set of last source address (LSA) registers for each port it supports, using its management interface. The master management device 100 contains an ethernet media access control (MAC) function which is capable of receiving packets from the IRB 114 and forwarding them on to the remote bridge interface port 118, and vice-versa. Using the MAC function, the master management device/bridge 100 acts as a two-port ethernet bridge, with the repeater collision domain acting as one virtual port and the remote bridge interface port 118 acting as the second port. The slave management devices 102, 104 typically do not contain this function, and control is instead directed by the master management device/bridge 100.

When an ethernet packet is transmitted onto the IRB 114, each attached master or slave management device 100, 102, 104 compares the destination address of the packet to the last source address registers for each of the ports it supports. If any slave management device finds a match between the destination address and one of its last source address registers, the slave management device asserts the local signal connection, which is typically a hardwired connection between the management devices. As described below, the local signal connection 116 is subsequently used by the master management device/bridge 100 to determine whether the packet is forwarded to the remote bridge interface port 118 or else filtered and not forwarded.

If the master management device 100 finds a match between the packet destination address and one of its last source address registers, or if the master management device 100 detects that the local signal connection 116 is asserted, then the master management device 100 filters the packet and does not forward the packet to the remote bridge interface port 118. Alternatively, if the master management device 100 does not find a match between the packet destination address and any of its last source address registers, and if the local signal connection 116 is not asserted, the master management device 100 receives the packet using its ethernet MAC function, and subsequently forwards it on to the remote bridge port interface port 118.

The preferred embodiment provides initialization, control and status of up to three repeaters, including the following functions:

1. Link Status and Link Status Change.
2. Partition Status and Partition Status Change.
3. Polarity Status.
4. AUI Status (AUI ports only).
5. Auto Partitioning Enable/Disable.
6. Link Integrity Checking Enable/Disable.
7. Polarity Detection/Correction Enable/Disable.
8. Enable/Disable for the Transmitter and Receiver (independent).
9. Reduced Squelch (extended range) Enable/Disable.

The present invention supports the Ethernet MIB through a status word that is written out to memory as part of a packet header whenever a packet is transmitted or received. This same information is also available in transmit and receive status registers. The MAC host channel has an RMON probe mode, which receives all, including self-generated, traffic. This enables a software application to support the other seven RMON groups.

Figure 2:
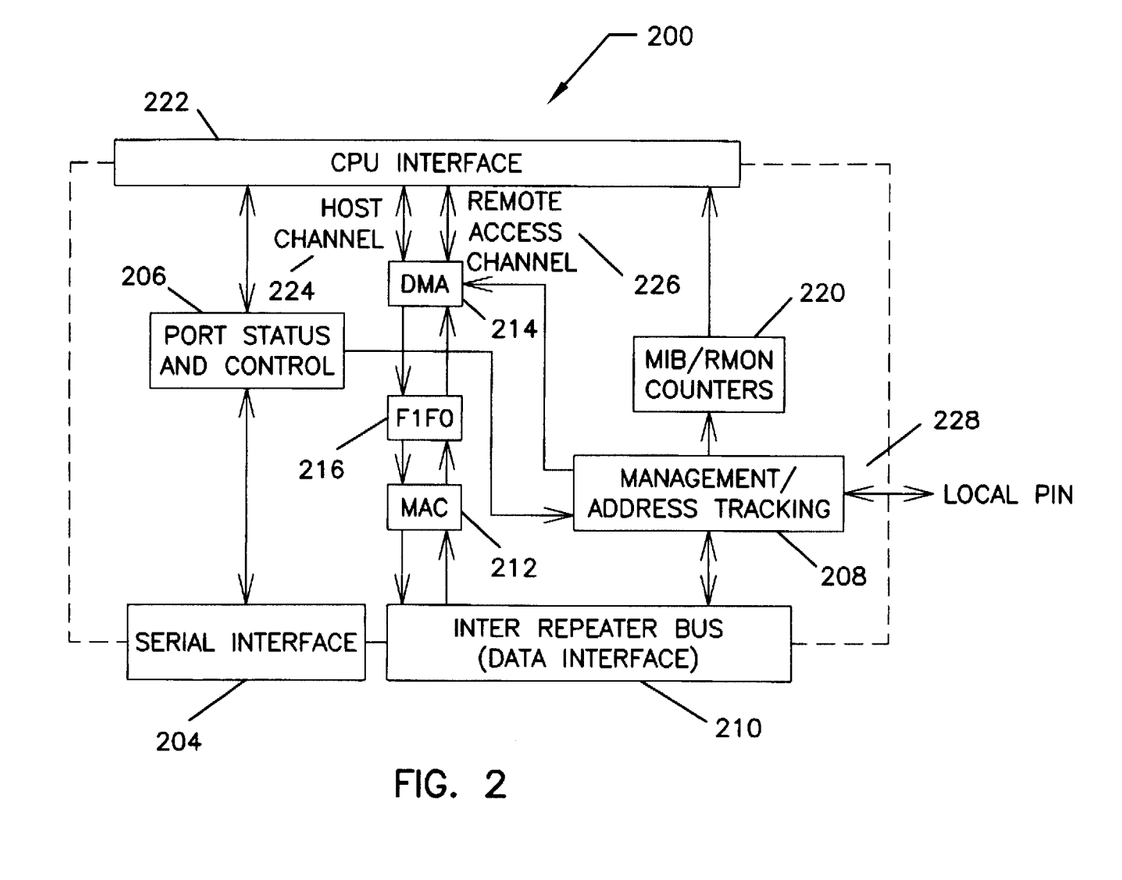
FIG. 2 is a system block diagram showing a repeater management device (RMD) in accordance with the present invention.

A repeater management device (RMD) 200 in accordance with the present invention is illustrated in FIG. 2. The RMD 200 uses a serial interface 204 connecting with the repeaters to route information pertaining to port status and control 206. This information may then be relayed to the management and address tracking function 208. A repeater data interface 210 is used by the management and address tracking function 208 as well as with the MAC 212, DMA 214, and FIFOs 216 for snooping the inter repeater bus. MIB and RMON counters 220 are provided per port for tracking repeater port status. The port status and control 204, DMA 214 and the MIB and RMON counters have access to the CPU interface 222. A host channel 224 and a remote access channel 226 are provided between the CPU interface 222 and the DMA 214. The transfer of information to the management and address tracking function 220 is controlled using security monitoring defined in the management and address tracking function 220. Finally, a local port 228 provides a communication channel to other RMDs 200.

Figure 3:
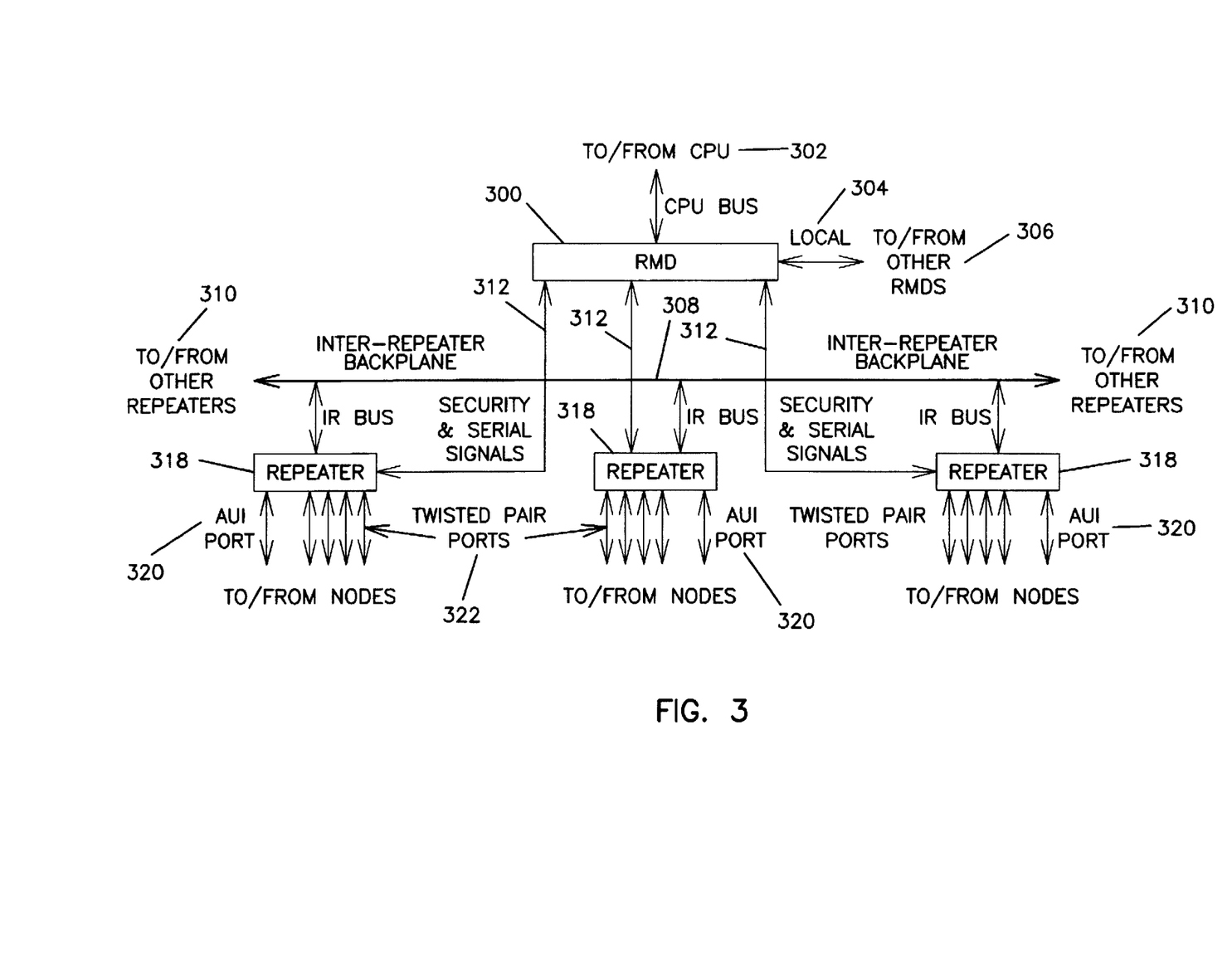
FIG. 3 is a block diagram of a RMD system in accordance with the present invention.

The preferred embodiment of the present invention provides a complete Ethernet MAC with all the standard functions plus several enhanced features, as shown in FIG. 3. FIG. 3 illustrates the implementation of the repeater management device (RMD) 300. A CPU bus connects the RMD 300 to a CPU 302. A local port 304 is used to transfer information to and from other RMDs 306. An inter-repeater bus 308 routes information to and from remote repeaters 310. Security and Serial signals 312 are routed to repeaters 318 connected to the RMD 300. The repeaters provide AUI ports 320 and twisted pair ports 322.

Security

The preferred embodiment of the present invention provides several security features including Source Address Tracking, Source Address Matching and a Secure Operations Mode.

The Source Address Tracking function constantly tracks the source addresses on each of 15 ports and latches them to registers which can be read at any time. When the source address of any port changes, the system latches the identity of that port and asserts its interrupt line. This provides for intruder detection.

The Source Address Matching function constantly compares the source addresses of incoming packets to an address programmed into a register. If a match occurs, the system latches the identity of the port which received the packet and asserts its interrupt line.

The Secure Operations Mode can be enabled on a port-by-port basis. The destination address of an incoming packet is compared to the tracked source addresses of all enabled ports; any port which does not match receives a "jam" pattern instead of the original packet. Ports that do not have this function enabled continue to operate normally.

Memory Structure

Figure 4:
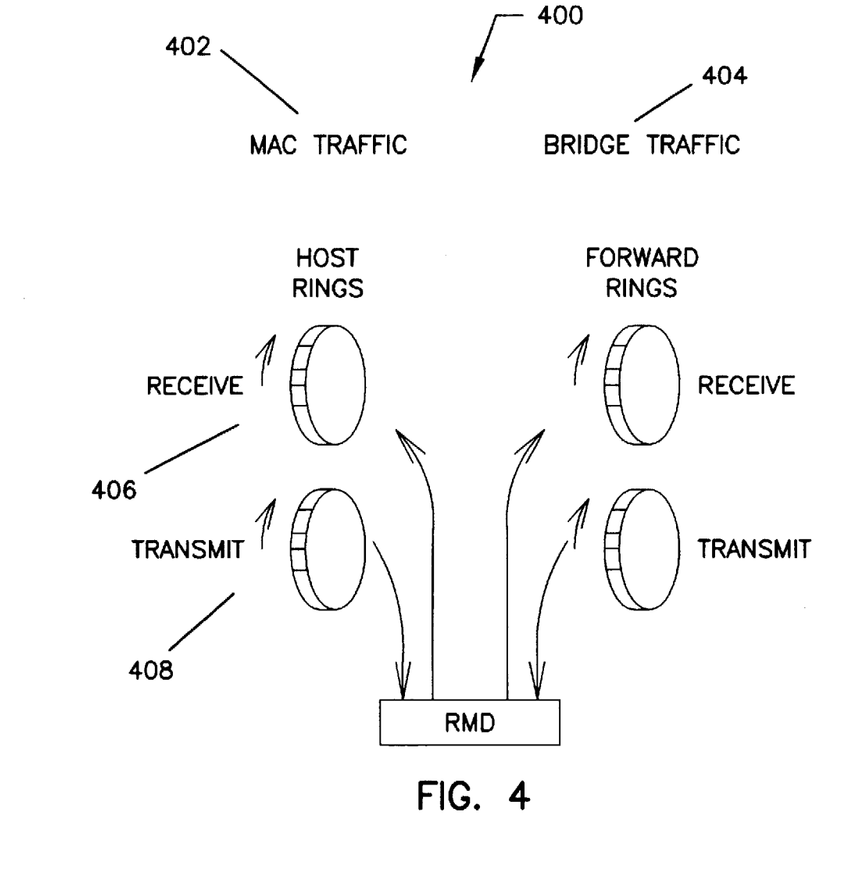
FIG. 4 is a system diagram showing routing of MAC and bridge packets which is compatible with the present invention.

The system DMA's packets directly to and from memory with low CPU overhead. FIG. 4 illustrates a dual-ring structure 400 for the MAC traffic 402 and the Bridge traffic 404. Packet memory is implemented in the dual-ring host structure 400 with one ring used for receive traffic 406 and the other ring used for transmit traffic 408.

Packets to be transmitted are first loaded in the Host Transmit Ring 408. Each packet is then preceded by a 4-byte header. The header includes a control byte, a pointer to the next packet, a status byte and the packet length. Multiple packets can be chained together using two bits in the control byte. A cyclic redundancy check (CRC) can either be loaded as part of each packet, or generated by the system, controlled on a packet-by-packet basis through another bit in the control byte.

When a bit in the Control Register of the system is set, the transmitter begins operation by loading the start of the first packet into an internal 32-byte FIFO. Network access is attempted as soon as possible. The system generates and transmits a 62-bit preamble, followed by a start of frame delimiter, and then begins to transmit the packet data. If a collision occurs, the system stops transmission of the packet, emits a jam pattern for a period of time specified in the 802.3 standard, and then re-attempts transmission after a back-off time. If multiple collisions occur, the back-off time is increased following a standard truncated exponential algorithm. After 16 collisions, transmission is aborted.

Once transmission of a packet is completed, the system updates the status byte in the packet header and the Transmit Status Register, optionally provides an interrupt, and automatically starts transmission of the next packet in the ring, if there is one. When there are no more packets in the ring, the system stops transmitting. The Transmit Status Register and status byte in the packet header contain all the information needed to support the Ethernet MIB in software.

When the system receives a packet, it places it in the Host Receive Ring, along with a 4-byte header and CRC. The header has the same format as that for a transmit packet. The status byte, which is also available through the Receive Status Register, has all the information needed to support the Ethernet MIB.

Through the Receive Configuration Register, the processor can control exactly what kinds of packets can be received into the Host Receive Ring. For example, received packets may include Broadcast Packets, Multicast Packets (even if this is disabled, the system will still receive packets that match one of the 9 spare MAC addresses), All Unicast Packets (if this is disabled, the system will receive only Unicast packets that match its MAC Address), Errored packets in any combination (long, runt, CRC error, collision fragments—but note that long packets are preferably truncated to 1518 or 2040 bytes depending on the setting of the JabberEnable bit in this register), and RMON Probe mode.

Operation of Ring Structure

Figure 5:
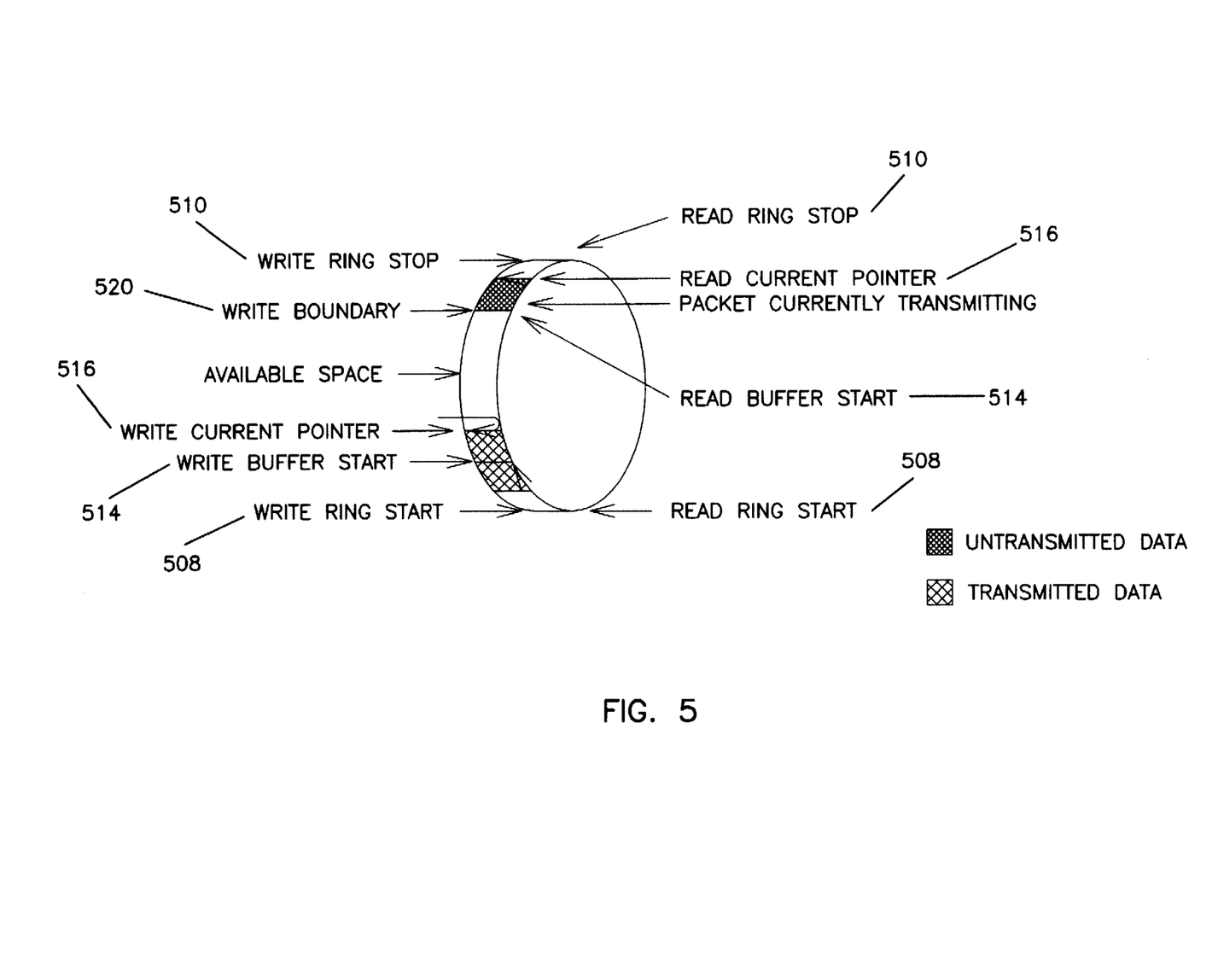
FIG. 5 is a block diagram illustrating a direct memory access (DMA) ring structure which is compatible with the present invention.

The Host Transmit Ring 500 is controlled through a set of 6 registers which are illustrated in more detail with reference to FIG. 5. The Start 508 and Stop 510 Registers, which must lie on 2K boundaries locate the ring 500 in memory. The Buffer Start 514, Current 516 and Next 518 pointers are used during packet processing, they should be initialized to point to the first packet to be transmitted. Note that all packets preferably start on 8-byte address boundaries.

The Host Receive Ring is defined in the same way, but has one additional register, the Write Boundary register 520. If the receiver reaches the Write Boundary 520 while receiving a packet, it terminates packet reception and sets a bit in the Interrupt Status Register. However, it does not stop operation, and continues to attempt to receive packets to the ring. If the Write Boundary 520 is placed outside the bounds defined by the ring start 508 and stop 510 registers, the receiver will continuously receive all packets to the ring 500, overwriting previously received packets even if they have not been read.

If the receiver reaches the Stop Boundary 510 while receiving the packet, it completes reception of the packet, then resets its pointers back to the Start 508 of the ring 500. At least 2K bytes of unused memory should be allocated beyond the boundary of the receive ring. An ownership bit in the status byte of the packet header is used to indicate the read/write status of a packet. The receiver always sets this bit to 1, the transmitter to 0. The transmitter and receiver work independently, each has a 32 byte FIFO internal to the system. Thus the system supports full duplex Ethernet operation. Once initialized, the system transmitter and receiver continue to function without further intervention. There are only two conditions which can cause a fatal error: a transmit FIFO underflow or a receive FIFO overflow. Either condition requires an external device to re-initialize the rings and re-start the operation. Either condition is evidence of a serious design problem (insufficient bus bandwidth).

Bridge Rings

For the bridge application, the system supplies a second pair of Forward Transmit and Receive rings, with their own sets of control registers, which function identically to the Host Rings.

The system supplies an automatic filtering function for packets going into the Forward Receive Ring. Only non-errored, valid-length packets that meet one of the following conditions are written to the Forward Receive Ring. For example, Broadcast Packets or Multicast Packets and Unicast packets that do not match the MAC address or any local source address (provided that the local pin is not asserted) may be written to the Forward Receive Ring. A local pin is used by the slave management devices in an auxiliary way. The slave management devices assert this pin to indicate that the current packet is local (i.e. matches one of its local source addresses) and therefore should not be forwarded.

CPU Interface

The system directly provides two compatible modes of bus operation, with either 16-bit or 32-bit bus width. These modes are selected using external pins. The system requests ownership of the CPU bus in order to perform its DMA and semaphore functions.

System Data Interface

The system data interface consists of the Inter Repeater Backplane (IRB), the 10 Mhz clock and the 20 Mhz clock. The IRB consists of 5 signals. Preferably, the IRB interface runs in a synchronous mode (i.e. 10 and 20 MHz supplied by external clock drivers and not by the repeaters.

The system management interface consists of the SDI, SDO, SENI and SENO signals. The system management interface is used by the system to configure up to three systems. The system management interface is also used by the system to provide status information about their ports and about packets they have recently received.

The system security interface consists of 15 signals, one for each supported port. When the signal that corresponds to a particular port is asserted, that port is put into secure operations mode.

Local Pin

The Local pin is used to daisy chain slave management devices onto a system. The slave management device asserts this pin to indicate that an incoming packet matches one a source address of one of the ports it manages. When the system detects that this pin is asserted, it will reject the incoming packet from the forward receive ring. If not used, this signal should be un-asserted.

Conclusion

Those skilled in the art will recognize that the present invention is applicable to any I/O device adapter that has a memory and is not limited to network adapters. The application cited in the present specification is for illustrative purposes only and is not intended to be exhaustive or to limit the invention to the precise form disclosed.

Those skilled in the art will also recognize that the present invention is applicable to systems with different configurations of devices and components.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An external management device for routing a packet between a receiving port and a destination port, comprising:
   an inter repeater bus (IRB) for transferring a data packet between the receiving port and the destination port;
   a master management device logically coupled to the IRB for maintaining master last source address (LSA) registers and for controlling data transfers through a bridging device;
   a slave management device logically coupled to the IRB for maintaining slave LSA registers and for controlling data transfers through the receiving port and destination port;
   a first transceiver logically coupled to the master management device for repeating a data packet on the IRB through a first port segment;
   a second transceiver logically coupled to the slave management device for repeating a data packet on the IRB through a second port segment; and
   a local signal connection, logically coupled to the master management device and the slave management device, for enabling the master and slave management device to communicate without using the inter repeater bus.

2. The bridging device of claim 1 further comprising a remote bridge interface logically coupled to the master management device.

3. The bridging device of claim 2 wherein the slave management device compares a destination address of the packet to the slave LSA registers and asserts the local signal connection if there is a match between the destination address of the packet and the slave LSA registers.

4. The bridging device of claim 3 wherein the master management device compares a destination address of the packet to the master LSA registers and forwards the packet to the remote bridge interface if there is no match between the destination address of the packet and the master LSA registers and if the local signal connection is not asserted.

5. The bridging device of claim 3 wherein the master management device compares a destination address of the packet to the master LSA registers and does not forward the packet to the remote bridge interface if there is a match between the destination address of the packet and the master LSA registers.

6. The bridging device of claim 3 wherein the master management device does not forward the packet to the remote bridge interface if the local signal connection is asserted.

7. The bridging device of claim 2 comprising a maximum of 1024 ports divided into segments of N ports each.

8. The bridging device of claim 7 wherein the first transceiver comprises a single segment of N ports.

9. The bridging device of claim 7 wherein the second transceiver comprises a single segment of N ports.

10. A method of routing a packet between a receiving port and a destination port, comprising the steps of:
    receiving a packet having a destination address on a port of a bus;
    storing the packet in a memory attached to a bus, the memory and the bus being shared by a slave management device and a master management device having bridging functions for forwarding the packet to a destination address via a bridge interface port; and
    the slave management device comparing the destination address of the packet to slave last source address (LSA) registers and asserting a local signal connection if there is a match between the destination address of the packet and the slave LSA registers, the assertion of the local signal connection distributing a forwarding decision to the master management device that the slave management device is forwarding the packet.

11. The method of claim 10 further comprising the step of the master management device comparing the destination address of the packet to master LSA registers and forwarding the packet to the destination port if there is no match between the destination address of the packet and the master LSA registers and if the local signal connection is not asserted.

12. The method of claim 10 further comprising the step of the master management device compares a destination address of the packet to the master LSA registers and does not forward the packet to the destination port if there is a match between the destination address of the packet and the master LSA registers.

13. The method of claim 10 further comprising the step of the master management device not forwarding the packet to the destination port if the local signal connection is asserted.

14. The method of claim 10 wherein the destination port comprises a remote bridge interface.

15. The method of claim 10 wherein the receiving port comprises one of a maximum of 1024 ports divided into segments of N ports each.

16. The method of claim 15 wherein the master management device comprises a single segment of N ports.

17. The method claim 15 wherein the slave management device comprises a single segment of N ports.

* * * * *

UNITED STATES PATENT AND TRADEMARK OFFICE
CERTIFICATE OF CORRECTION

PATENT NO. : 5,764,638

DATED : JUNE 9, 1998

INVENTOR(S) : KETCHUM

It is certified that error appears in the above-identified patent and that said Letters Patent is hereby corrected as shown below:

Front page, [73] Assignee: "Sacremento" should read --Sacramento--

Signed and Sealed this

Nineteenth Day of October, 1999

Attest:

Q. TODD DICKINSON

Attesting Officer

Acting Commissioner of Patents and Trademarks